Patented Nov. 20, 1934

1,981,044

UNITED STATES PATENT OFFICE

1,981,044

PROCESS OF MANUFACTURING ARSENATE OF ZINC AND THE PRODUCT

Oscar F. Hedenburg, Pittsburgh, Pa., assignor to Rex Research Corporation, Toledo, Ohio No Drawing. Application December 29, 1932, Serial No. 649,331

8 Claims. (Cl. 23—53)

This invention relates to an improved process of manufacturing arsenate of zinc and to the improved product produced by the process.

The objects of the invention are:

First, to produce arsenate of zinc that is in very small particle size form.

Second, to produce an arsenate of zinc which is very high in arsenic content and which is also neutral and substantially insoluble in water with high suspension properties.

Further objects pertaining to details will appear from the description to follow.

In carying out my invention, a moderate sized batch is produced as follows:

To 12000 pounds of water introduced into a tank having a strong agitator and at a temperature of about 60° C., I add 10 pounds of caustic soda of such strength as to give the full equivalent of 10 pounds of the said caustic soda or sodium hydroxide.

While under agitation I add thereto 1000 pounds of zinc oxide. This zinc oxide is precipitated or ground to a substantially impalpable powder, so that it will be readily suspended in the water by agitation.

I then dissolve 705 pounds of arsenic acid, full strength, diluting the same up to 2000 pounds of water, so that there are 2000 pounds of arsenic acid solution. I then add this arsenic acid solution slowly to the agitated suspension of zinc oxide, the arsenic acid being delivered over a period of two hours. A shorter period can be made use of with quite satisfactory results. The suspension of zinc oxide is thus maintained in alkaline condition during the reaction.

The arsenic acid forms arsenate of soda, a comparatively weak solution, which reacts upon the zinc oxide at the same time that the zinc oxide is also being acted upon by the arsenic acid. Alkalinity is thus maintained up to the end of the reaction.

When the precipitation of arsenate of zinc is completed, I filter out and produce thereby 1760 pounds of arsenate of zinc having the formula $(4ZnO \cdot As_2O_5 \cdot H_2O)$. This is basic zinc arsenate. The equivalent of substantially 38% of $As_2O_5$ is present. The reaction is negative to acid test. The precipitation is in the form of very fine particles estimated at less than a micron in diameter. Zinc arsenate prepared in this way remains in suspension in water for a considerable period of time, making it especially available for use as an arsenic spray for agricultural and horticultural purposes. The fine dust is available for dusting.

The product can be prepared quite effectively by omitting the sodium hydroxide. Any alkali may be substituted for the sodium hydroxide, but so far as I am aware this is the most economical alkali. Potassium hydroxide can be used. Ammonium hydroxide is available, although neither of these alkalis are so effective and economical as the sodium hydroxide.

I wish to claim the process broadly. I also wish to claim the product broadly and to claim particularly the neutral finely divided insoluble arsenate of zinc as an insecticide, all as pointed out in the appended claims.

Having thus described my invention what I claim as new and desire to secure by Letters Patent is:

1. The process of manufacture of arsenate of zinc consisting in suspending and agitating in 12000 pounds of water at a temperature of 60° C. 1000 pounds of finely divided zinc oxide, dissolving therein 10 pounds of sodium hydroxide, and gradually adding thereto a solution of 705 pounds or equivalent of arsenic acid dissolved in 1300 pounds of water, over a period of substantially two hours.

2. The process of manufacture of arsenate of zinc consisting in suspending and agitating in 12,000 pounds of water at a temperature of 60° C. 1000 pounds of finely divided zinc oxide, and gradually adding thereto a solution of 705 pounds or equivalent of arsenic acid dissolved in 1300 pounds of water, over a period of substantially two hours.

3. The process of manufacture of arsenate of zinc consisting in dissolving and suspending in water the combining equivalent of zinc oxide in which has been dissolved 1% of the weight of the zinc oxide of sodium hydroxide, and gradually adding thereto the combining equivalent of arsenic acid solution.

4. The process of manufacture of arsenate of zinc consisting in dissolving and suspending in water the combining equivalent of zinc oxide in which has been dissolved 1% of the weight of the zinc oxide of an alkaline solution, and gradually adding thereto the combining equivalent of arsenic acid solution.

5. The process of manufacture of arsenate of zinc consisting in dissolving and suspending in water the combining equivalent of zinc oxide, and gradually adding thereto the combining equivalent of arsenic acid solution.

6. Basic arsenate of zinc in finely divided form produced by the action of arsenic acid on a suspension of zinc oxide in the presence of an alkali.

7. Basic arsenate of zinc in finely divided form produced by the action of arsenic acid on a suspension of zinc oxide in the presence of sodium hydroxide.

8. The process of manufacture of zinc arsenate consisting in dissolving and suspending zinc oxide in water in which has been dissolved 1 per cent of the weight of the zinc oxide of a caustic alkali, and gradually adding thereto an arsenic acid solution.

OSCAR F. HEDENBURG.